United States Patent Office 2,710,877
Patented June 14, 1955

2,710,877
SYNTHETIC LUBRICATING COMPOSITION

David W. Young, Westfield, Delmer L. Cottle, Highland Park, and Leland K. Beach, Westfield, N. J., assignors to Esso Research and Engineering Company, a corporation of Delaware No Drawing. Application June 5, 1952,
Serial No. 291,968

6 Claims. (Cl. 260—485)

This invention relates to synthetic lubricating compositions of the complex ester type. Particularly it relates to lubricating compositions prepared by reacting a glycol, a dibasic acid and an alcohol in proportions such that two mols of dibasic acid and two mols of alcohol are reacted with each mol of glycol. More particularly the invention relates to complex ester type synthetic lubricating oils which contain at least a minor proportion of a halogenated alcohol residue.

It is known in the art that synthetic lubricants having outstanding viscosity characteristics at both high and low temperatures may be prepared by forming a glycol-dibasic acid-alcohol complex ester. This complex ester has the following structural formula $$ROOC—(CH_2)_n—COOR'OOC—(CH_2)_nCOOR$$

wherein R is the alcohol residue and contains from 2 to 18 carbon atoms, R' is the glycol residue and contains from 1 to 30, preferably 2 to 12, carbon atoms, and wherein $n$ is a number from 1 to 8. It has been found recently that these complex esters may best be prepared by forming a half ester of the dibasic acid with the alcohol and then reacting two mols of such half-ester with one mol of a glycol. These complex esters are generally referred to as the "glycol-centered" complex ester.

It has now been found, and forms the object of this invention, that complex esters of this type that have, in addition to outstanding viscosity properties at high and low temperatures, greatly superior flash points may be prepared by combining in the molecular structure at least a minor amount of a halogenated material, such as a halogenated acid, a halogenated glycol, or a halogenated alcohol. In addition to the greatly superior flash points and the improved high and low temperature viscosities, these new compositions of matter have extreme pressure resisting properties that add to their utility as lubricating compositions.

As was stated above, the new compositions of matter are prepared by reacting together one mol of a glycol, two mols of a dibasic acid, and two mols of an alcohol. A more detailed description of the reaction components is set out below.

THE GLYCOL REACTANT

The glycol which serves as a central portion of the molecule of this new complex ester has the following general formula:

$$H—O—(R)—O—H$$

wherein R is an aliphatic radical containing from 1 to 30 carbon atoms. Although the formula above depicts a glycol wherein the hydroxyl groups are attached to terminal carbon atoms there is no limitation as to which carbon atoms carry the hydroxyl groupings. The operable embodiments of the invention contemplate such glycols as 1,3-butane diol, 1,4-butane diol, and the like. Those glycols that are prepared from an ethylene oxide are also included within the scope of the invention. These glycols contain oxygen in ether linkages within the aliphatic chain and are such materials as triethylene glycol, tetra-ethylene glycols, and the like.

THE DIBASIC ACID

The dibasic acid reactant utilized in forming the new compositions of this invention are those dibasic acids corresponding to the following formula:

$$H—O—O—C—(CH_2)_n—C—O—O—H$$

wherein $n$ is an integer of from 1 to 8. Included among the operable dibasic acids are the following: malonic, succinic, glutaric, adipic, pimelic, suberic, azelaic, and sebacic.

THE ALCOHOL REACTANT

As was stated above, it is the concept of this invention that at least a minor amount of a halogenated molecule, such as a halogenated alcohol, be utilized in the formation of the complex ester composition. In the preferred embodiment a halogenated alcohol is used. Since the total amount of the esterifying alcohol used will be twice the number of mols of the glycol, at least 5%, preferably 2% to 10% of the esterifying alcohol should be a halogenated alcohol. Of the halogenated alcohols operable, chlorinated or fluorinated alcohols such as trichloroethanol, trifluoroethanol, trichlorobutanol, difluoro-mono-chlorobutanol, and tetrafluoropentanol are preferred. The balance of the alcohol used as the esterifying alcohol is a monohydric alcohol containing from 2 to 18 carbon atoms. The alcohol is preferably aliphatic in nature and the carbon chain may be either branched or straight. Exemplary of the aliphatic monohydric alcohols operable are the following: butyl, isobutyl, amyl, isoamyl, pentyl, isopentyl, hexyl, heptyl, octyl, 2-ethyl hexyl, 2-ethyl butyl, etc. A group of alcohols especially adapted for use in this invention are the so-called "Oxo" alcohols, prepared by the reaction of carbon monoxide and hydrogen upon the olefins obtainable from petroleum products. Materials such as diisobutylene and C$_7$ olefins are suitable for this purpose, also higher molecular weight olefins are sometimes employed. The alcohols obtained in this manner normally have a branched chain structure. The "Oxo" process for the preparations of these alcohols was developed in Germany and first described in this country in a patent to Roelen, U. S. 2,327,066, granted August 17, 1943.

The preparation of the complex ester of the instant invention is straightforward and poses no problems to those familiar with the art. Generally the preparation of the ester is accomplished as follows:

C$_8$ Oxo alcohol (520 g.), 180 grams of butanediol 1–3, 584 g. of adipic acid and 35 g. of trichloroethanol are placed in a 2 liter round bottom Pyrex flask fitted with a water cooled condenser and a side arm tube that is used to remove the by-product water of reaction. To this mixture in the flask is also added 200 g. of xylene to act as a solvent and water entrainer. The mixture is heated to the boiling point of the mixture at normal pressures (760 mm. Hg) for 34 hours. After this reaction has been completed, the product is washed with water, 5% Na$_2$CO$_3$ water solution, and water, then distilled to remove solvent and unreacted chemicals. The complex ester is stripped to a pot temperature of 200° C. at 2 mm. Hg. Final yield of complex ester was 86 mol percent.

To further illustrate the concept of this invention the following specific examples are given:

Example I

A complex ester according to the concept of this invention was prepared using the formulation below:

|  | Grams |
|---|---|
| Adipic acid | 584 |
| Butanediol-1,3 | 180 |
| Trichloroethanol | 290 |

The ester was prepared as follows:

The above mixture was placed in a 2 liter Pyrex round bottom flask fitted with a water cooled condenser and a side arm (used to remove by product of reaction). Xylene (200 g.) was used as a solvent for the reaction and also as an acid to azeotrope out the water formed in the ester type reaction. The mixture was heated for 35 hours at the boiling point under normal pressures (760 mm. Hg). After this, the product was washed with water, 10% $Na_2CO_3$ and water. After drying over $CaCl_2$ the material was heated to 200° C. pot temperature to remove light solvent and unreacted chemicals. Yield of final complex ester was 72 mol percent.

The final product has the following properties:

Viscosity:
- At 100° F _____ 80.5 SUS.
- At 210° F _____ 39.3 SUS.
- At −40° F _____ 21,800 C. S.
- ASTM pour point (°F.) _____ −50.
- Flash point (°F.) _____ 455.
- Extreme pressure properties _____ 15 wts. on Almen machine.

Example II

A second complex ester in accordance with the concept of this invention was prepared from the following formulation:

|  | Grams |
|---|---|
| Adipic acid | 584 |
| Butane diol-1,3 | 180 |
| C₈ Oxo alcohol | 500 |
| Trichloroethanol | 20 |

This ester was prepared by the procedure of Example I.

The following properties were found for this ester:

Viscosity:
- At 100° F _____ 129.9 SUS.
- At 210° F _____ 44.8 SUS.
- At −40° F _____ 10,520 C. S.
- Pour point (°F.) _____ −75.
- Flash point (°F.) _____ 485.
- Extreme pressure properties _____ 15 wts. on Almen machine.

The ester prepared as described above was also submitted to the MIL-L-6387 Hydrolytic Stability test. This test measures the stability of the ester in contact with water and copper and is described in detail in Military Specification MIL-L-6387 Specification for Lubricating Oils, Synthetic Base, a military publication. In brief the test comprises placing the oil to be tested in a bottle with water and a copper plate and maintaining for 48 hours at a temperature of 200° F. with adequate mixing. After the test period the Neutralization Number change of the water and oil layers are measured, and the copper plate is examined for weight loss. The ratings are "pass" and "fail" as in accordance with the specifications given. The ester of Example II passed this test.

Example III

By the procedure of Example I a third complex ester was formed from the following formulation:

|  | Grams |
|---|---|
| Adipic acid | 584 |
| Butane diol,1-3 | 180 |
| C₈ Oxo alcohol | 500 |
| Trichloroethanol | 35 |

The properties of this ester are as follows:

Viscosity:
- At 100° F _____ 174.0 SUS.
- At 210° F _____ 45.5 SUS.
- At −40° F _____ 13,000 C. S.
- Pour point (°F.) _____ Below −65.
- Flash point (°F.) _____ 455.
- Extreme pressure properties _____ 15 wts. on Almen machine.
- Hydrolytic stability (MIL-L-6387 spec.) _____ Passed

Example IV

A fourth ester was prepared using the procedure employed in Examples I and IV and having the following formulation:

|  | Grams |
|---|---|
| Adipic acid | 584 |
| Butane diol-1,3 | 180 |
| C₈ Oxo alcohol | 500 |
| Trifluoroethanol | 35 |

The properties of this product are as follows:

Viscosity:
- At 100° F _____ 177.0 SUS.
- At 210° F _____ 50.3 SUS.
- At −40° F _____ 12,740 C. S.
- Pour point (°F.) _____ Below −75.
- Flash point (°F.) _____ 470.
- Extreme pressure properties _____ 15 wts. on Almen machine.
- Hydrolytic stability (MIL-L-6387 spec.) _____ Passed.

Example V

For purposes of comparison, a complex ester similar to that of Example II was prepared using no halogenated alcohol and gave the following properties:

Viscosity:
- At 100° F _____ 178.0 SUS.
- At 210° F _____ 50.6 SUS.
- At −40° F _____ 12,867 C. S.
- Pour point (°F.) _____
- Flash point (°F.) _____ 430.
- Extreme pressure properties _____ 6 wts. on Almen machine.
- Hydrolytic stability (MIL-L-6387 spec.) _____ Passed.

To summarize briefly, this invention relates to complex ester lubricants which contain combined in the molecular structure minor amounts of a halogen. In the preferred embodiment of the invention, the halogen is added by employing a halogenated alcohol as one of the esterifying agents used to form the complex ester. It is possible, however, to use, as one of the constituents of the molecule, a halogenated compound, such as a chlorinated or fluorinated glycol or acid, in minor amounts. Especially preferred, however, are the complex esters formed from two mols of a dibasic acid and two mols of alcohol with one mol of a glycol which contains at least a minor proportion of a halogenated alcohol residue in the molecular structure. A general formula for the synthetic lubricating oils of this invention would be as follows:

$$ROOC-(CH_2)_n-COOR'OOC-(CH_2)_n-COOR$$

wherein R is an alcohol residue and contains from 2 to 18 carbon atoms, R' is the glycol residue and contains from 1 to 30, preferably 2 to 12 carbon atoms, and wherein $n$ is a number from 1 to 8. At least one of the R groups must contain a halogen, that is, one alcohol residue is of a halogenated alcohol.

What is claimed is:

1. As a new composition of matter, a synthetic lubricating oil composition having outstanding lubricating properties which comprises a complex ester having the general formula:

ROOC—(CH$_2$)$_n$—COOR'OOC—(CH$_2$)$_n$—COOR wherein R is a hydrocarbon radical selected from the class consisting of alkyl and trihalogen-substituted alkyl groups and contains from 2 to 18 carbon atoms, R' is an organic radical selected from the class consisting of alkylene and oxyalkylene groups and contains from 1 to 30 carbon atoms, and wherein $n$ is a number from 1 to 8, at least one R group containing halogen atoms selected from the group consisting of chlorine and fluorine.

2. As a new composition of matter, a synthetic lubricating composition which comprises a complex ester of the general formula:

ROOC—(CH$_2$)$_n$—COOR'OOC—(CH$_2$)$_n$—COOR wherein R is a hydrocarbon radical selected from the class consisting of alkyl and trihalogen-substituted alkyl groups and contains from 4 to 10 carbon atoms, R' is an organic radical selected from the class consisting of alkylene and oxyalkylene groups and contains from 2 to 12 carbon atoms, and wherein $n$ is a number from 1 to 8, said complex ester having been prepared by utilizing from 2% to 10% by weight of an alcohol which is trihalogenated with halogens selected from the group consisting of chlorine and fluorine in its preparation.

3. As a new composition of matter, a synthetic lubricating composition according to claim 2 wherein the halogenated alcohol is trichloroethanol.

4. A synthetic lubricant according to claim 2 wherein said halogenated alcohol is trifluoroethanol.

5. As a new composition of matter, a synthetic lubricating composition which comprises a complex ester which has been prepared by reacting with one mol of butanediol-1,3 two molecular proportions of an alcohol half ester of adipic acid, wherein the esterifying alcohol consists of a mixture of a branched chain aliphatic monohydric alcohol having from 2 to 18 carbon atoms and an alcohol which is trihalogenated with halogens selected from the group consisting of chlorine and fluorine.

6. As a new composition of matter, a synthetic lubricating composition which comprises a complex ester which has been prepared by reacting together 584 grams of adipic acid, 180 grams of butanediol-1,3, 500 grams of C$_8$ Oxo alcohol, and 35 grams of trichloroethanol.

References Cited in the file of this patent

UNITED STATES PATENTS

| | | |
|---|---|---|
| 2,075,107 | Frazier | Mar. 30, 1937 |
| 2,443,741 | Kropa | June 22, 1948 |

FOREIGN PATENTS

| | | |
|---|---|---|
| 595,056 | Great Britain | Nov. 26, 1947 |